United States Patent
Hugonin

[15] 3,683,188
[45] Aug. 8, 1972

[54] APPARATUS FOR INSPECTING TUBULAR GOODS HAVING GUIDE MEMBERS TO FIX A DETECTOR IN THE CENTER OF THE TUBULAR GOODS

[72] Inventor: Gerald H. Hugonin, Houston, Tex.

[73] Assignee: Schlumberger Technology Corporation, New York, N.Y.

[22] Filed: March 26, 1970

[21] Appl. No.: 22,934

[52] U.S. Cl. .............. 250/83.3 D, 250/52, 250/83 C, 250/105, 250/106 S
[51] Int. Cl. .......................... G01t 1/17, G01h 23/02
[58] Field of Search ....250/83.3 D, 105, 106 S, 83 C, 250/52

[56] References Cited

UNITED STATES PATENTS 3,066,254  11/1962  Price et al. ......250/83.3 D UX
3,236,090  2/1966   Neal, Jr. ................250/83 C X Primary Examiner—Walter Stolwein
Assistant Examiner—Morton J. Frome
Attorney—Ernest R. Archambeau, Jr., David L. Moseley, Edward M. Roney, William R. Sherman and John P. Sinnott

[57] ABSTRACT

In the new and improved radiation apparatus disclosed herein for inspecting tubular goods, a radiation detector is adapted to be received within a tubular member being axially translated along a selected inspection axis for receiving radiation from a radiation emitter facing the detector and mounted in a body rotating around the exterior of the tubular member. To assure that the detector will remain coaxially positioned within a tubular member with a minimum of erratic movements in relation thereto, the detector is supported by fixed, depending slides which are adapted to be interchanged with other slides as required to correctly position the detector. The ends of the detector housing are uniquely shaped to facilitate the insertion of the detector housing into a tubular member advancing along the inspection axis without reducing the speed of movement of the tubular member.

9 Claims, 4 Drawing Figures

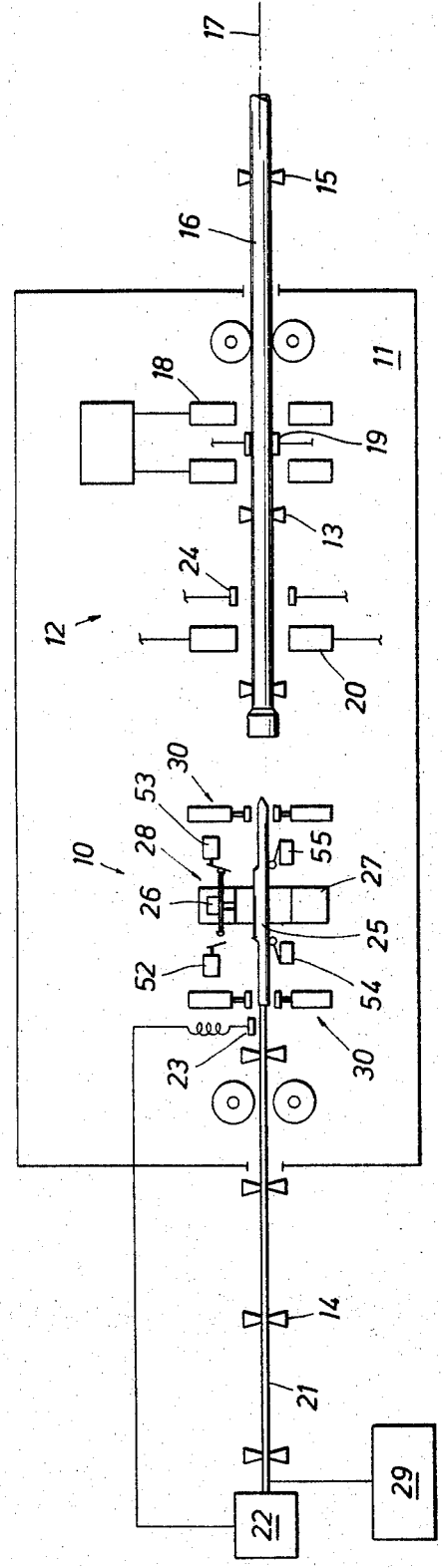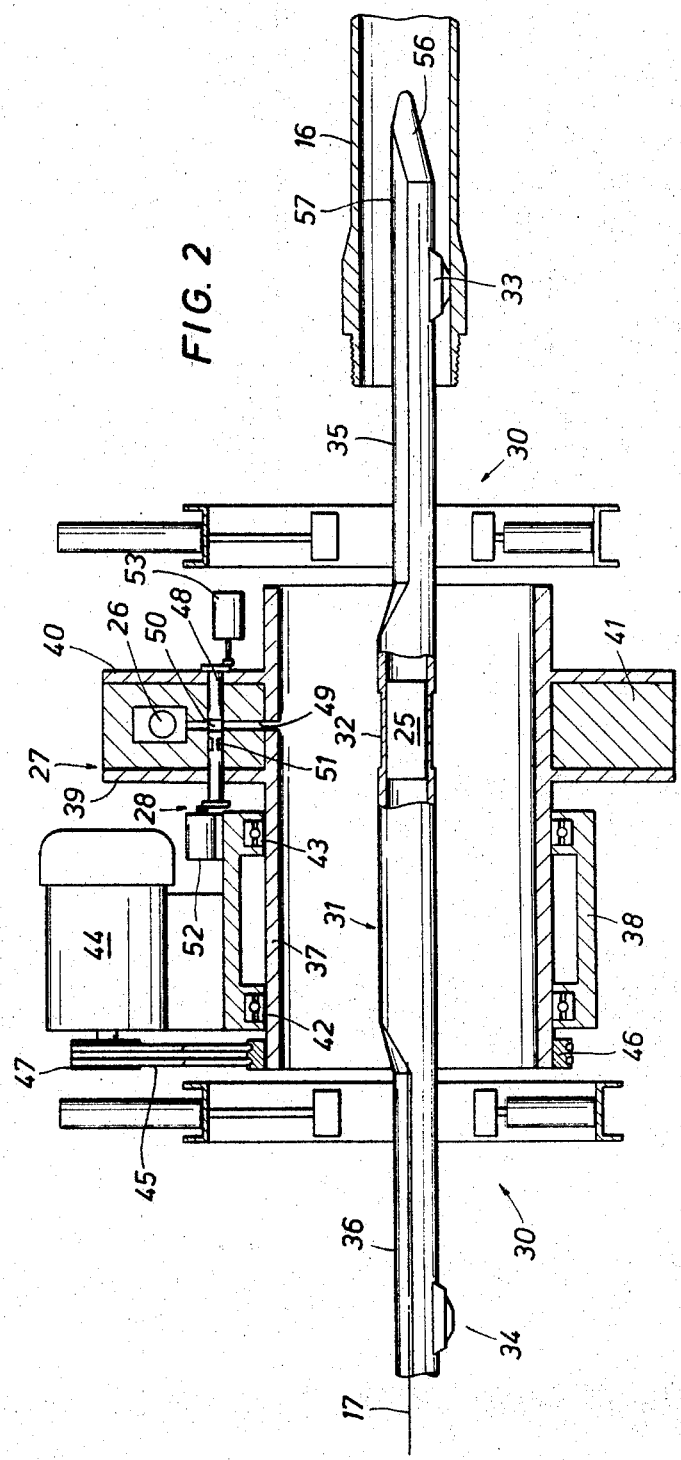
Gerald H. Hugonin
INVENTOR

Gerald H. Hugonin
INVENTOR

BY [signature]
ATTORNEY

APPARATUS FOR INSPECTING TUBULAR GOODS HAVING GUIDE MEMBERS TO FIX A DETECTOR IN THE CENTER OF THE TUBULAR GOODS

Elongated tubular goods, such as oil-field piping or tubing and the like, are frequently inspected for hidden flaws and other latent defects that might cause failure of such tubular members while in service. As one aspect of such inspections, it is often desired to also obtain representative measurements of wall thickness of such tubular members at spaced points along their length. Various thickness-measuring devices have, of course, been devised heretofore for inspecting long lengths of pipe and tubing. For instance, the new and improved inspection device disclosed in a copending Pat. application (Ser. No. 744,861) assigned to the present assignee has been found to provide accurate thickness measurements of various tubular goods at efficient inspection rates. As described in that application, a radiation detector is mounted on the free end of a fixed, but relatively flexible, elongated lance that is aligned along a selected inspection axis and adapted to receive a tubular member being moved axially along the axis. A radiation source is suitably mounted within an annular member adapted for rotation at high speeds around the exterior of a tubular member moving along the inspection axis.

Although this new and improved inspection apparatus has proven to be successful in certain situations, it has been found that where typical oil-field tubular goods are being inspected, the detector will tend to shift erratically as it rides along the inner walls of the moving tubular members. To compensate for this, one or more sets of spring-biased centralizers are typically employed for coaxially positioning the detector. It has been found, however, that if such centralizers are adapted to yield readily, the erratic movements of the detector will be aggravated. Conversely, if these spring-biased centralizers are particularly stiff, insertion of the detector into an advancing tubular member will often necessitate at least a momentary reduction in the speed of the tubular member to be certain that the detector safely enters the leading end of the tubular member. Moreover, once the detector is positioned within the tubular member, if the spring forces provided by the centralizers are substantial, the frictional drag of the centralizers along the internal wall often induce slippage of the conveyor driving members carrying the tubular member if the external surfaces thereof are covered with grease, mud or other slick substances.

Accordingly, it is an object of the present invention to provide new and improved radiation apparatus for inspecting different sizes of axially moving tubular members in which the radiation detector is inserted into such a member and retained in substantial coaxial alignment therewith as the tubular member is moved over the detector.

This and other objects of the present invention are attained by arranging the radiation detector in a generally tubular housing which is coincidentally aligned with and mounted on the free end of an elongated, generally flexible support. A plurality of guides are rigidly secured at selected positions only along the lower portion of the housing and operatively sized and arranged for riding along the internal wall of an axially moving tubular member to coaxially position the detector therein. Where different sizes of tubular members are to be inspected, various sets of shims as well as guides are provided and adapted to be readily substituted as required to coaxially position the radiation detector within each of the several sizes of the tubular members to be accommodated. The ends of the housing are also uniquely reduced and shaped to facilitate the insertion of the detector into an advancing tubular member.

The novel features of the present invention are set forth with particularity in the appended claims. The invention, together with further objects and advantages thereof, may be best understood by way of the following description of exemplary apparatus employing the principles of the invention as illustrated in the accompanying drawings, in which:

FIG. 1 schematically illustrates thickness-measuring apparatus employing the detector housing of the present invention as this apparatus may be arranged for cooperation with typical flaw-inspection apparatus;

FIG. 2 is an elevational view showing a preferred arrangement of the detector housing of the present invention adapted for use with the thickness-measuring apparatus depicted in FIG. 1;

Figure 3:
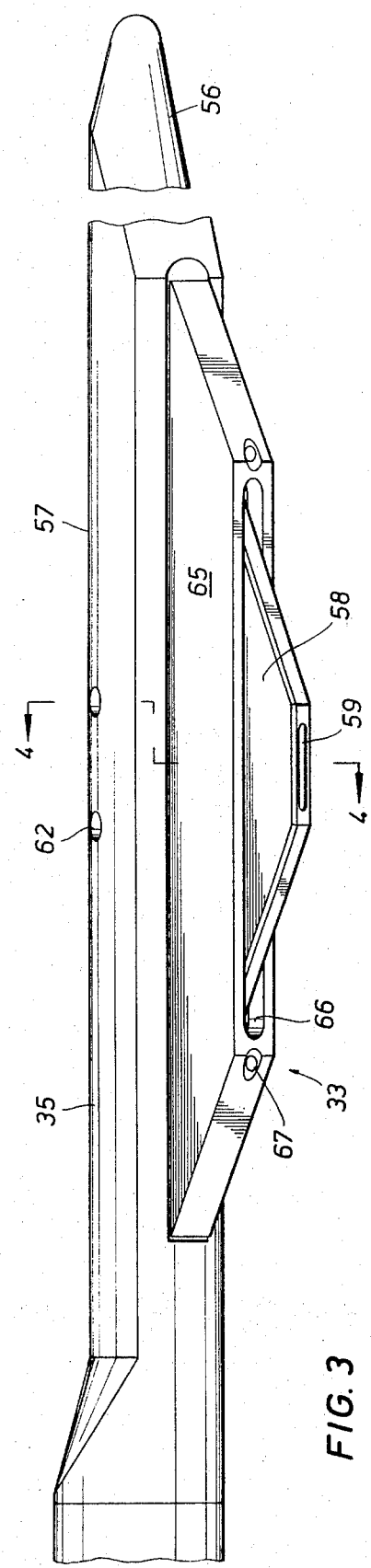
FIG. 3 is an enlarged elevational view of the forward end of the housing shown in FIG. 2 and depicts one set of the new and improved replaceable guides of the present invention.

Turning now to FIG. 1, a schematic plan view is shown of thickness-measuring apparatus 10 incorporating a preferred embodiment of the present invention and operatively mounted within a vehicle 11. To illustrate a typical situation in which the new and improved apparatus 10 can be advantageously used, the thickness-measuring apparatus is depicted as being axially aligned with other pipe-inspection apparatus 12 such as the flaw-inspection apparatus disclosed in the Tompkins Reissue U.S. Pat. No. 26,537. As is typical, the thickness-measuring apparatus 10 includes pipe-translating means, such as a selectively-powered conveyor 13 (which may be the conveyor shown in U.S. Pat. No. 3,565,310) mounted within the vehicle 11 and a pair of portable conveyors 14 and 15 (such as those disclosed in U.S. Pat. No. 3,250,404) arranged at the opposite ends of the vehicle, for selectively moving pipe section, as at 16, back and forth through the vehicle along a generally horizontal inspection axis 17.

Reference should be made, of course, to the aforementioned Tompkins patent for elaboration of the details of the flaw-inspection apparatus 12 and the particulars of its operation. However, the general arrangement of the flaw-inspection apparatus 12 and a typical inspection operation therewith should be understood to better appreciate its cooperation with the new and improved apparatus 10. In general, therefore, the flaw-inspection apparatus 12 is arranged to first progressively induce a longitudinally oriented magnetic flux in a horizontal pipe, as at 16, being advanced axially in a first direction along the conveyor 13 so that transversely oriented flaws in the pipe can be concurrently detected. Residual magnetism remaining in the pipe 16 is at least partially reduced by progressively subjecting the advancing pipe to a demagnetizing flux after it has been inspected for transversely oriented flaws. When the pipe 16 is also to be inspected for longitudinally oriented flaws, the pipe is moved onto the conveyor 14 and, after being halted, subjected to a circumferentially oriented magnetic field. Thereafter, as the pipe 16 is returned in the opposite direction along the inspection axis 17, it is progressively inspected for longitudinally oriented flaws. On the other hand, when this latter inspection is not performed, the pipe 16 is merely returned back through the vehicle 11 to the conveyor 15. In either situation, however, it is preferred that the new and improved thickness-measuring apparatus 10 be arranged for operation upon the return movement of the pipe 16 whether or not the latter flaw inspection is conducted.

To perform these inspections for transverse flaws, the inspection apparatus 12 preferably includes an annular coil 18 having spaced sections concentrically arranged around the inspection axis 17 with a plurality of flux-detecting heads 19 arranged therebetween. A second annular coil 20 is also concentrically arranged around the inspection axis 17 to the rear of the flux-inducing coil 18 and connected to a suitable AC or pulsating DC source (not shown) for progressively demagnetizing the pipe 16 as it leaves the flux-inducing coil.

The flaw-inspection apparatus 12 further includes an electrically conductive, cantilevered elongated probe or lance 21 that is supported at its remote end and maintained in substantially coincidentally alignment along the inspection axis 17. When the pipe 16 is to be inspected for longitudinal flaws, it is advanced onto the lance 21 and halted when the lance has passed completely through the pipe and its free end projecting out of the rearward end of the pipe. To subject the pipe 16 to a circumferentially oriented magnetic field, a DC source 22 is connected between the remote supported end of the lance 21 and one or more laterally movable electrical contacts 23 that are selectively engageable with the free end of the lance. Thereafter, as the pipe 16 is being returned, a plurality of flux-detecting heads 24 are selectively moved into contact with and coaxially rotated about the moving pipe for detecting generally longitudinal flaws therein. As previously mentioned, it is preferred to operate the new and improved thickness-measuring apparatus 10 as the pipe 16 is withdrawn from over the lance 21 whether or not the pipe is to be inspected for longitudinal flaws.

Although the present invention is equally suited for use with the inspection unit described in the aforementioned copending application, Ser. No. 744,861, the present invention is especially adapted for use with the new and improved inspection unit disclosed and claimed in three copending applications Ser. Nos. 22,932, 22,935, 22,933 and 22,934 filed simultaneously herewith. Accordingly, as depicted in FIG. 1, the thickness-measuring apparatus 10 is comprised of radiation-detecting means including a radiation detector 25 operatively positioned along the axis 17 and radiation means 26 mounted on a body 27 adapted for rotation about the inspection axis and cooperatively arranged for directing one or more inwardly-directed beams of radiation through the wall of the pipe 16 for interception by the radiation detector. As is fully explained in the aforementioned simultaneously filed copending applications, selectively controlled shutter means 28 are cooperatively arranged with new and improved circuitry 29 and one or two selectively operable detector-positioning clamps, as at 30, which are cooperatively arranged as described in the three simultaneously filed applications for checking the accuracy of the detector 25 before each inspection operation.

As illustrated in FIG. 2, the radiation detector 25 is a typical radioactivity detector, such as an ionization chamber or a scintillation detector, which is mounted in an enclosed protective housing 31 that is carried on the free end of the elongated probe 21 and arranged in accordance with the principles of the present invention. To adapt the detector 25 for movement relative to the lower internal wall of the pipe 16 as it is axially advanced or returned along the inspection axis 17, the protective housing 31 includes a central tubular portion 32 of nylon, or the like, that will not significantly attenuate incident radiation. As will subsequently be described in greater detail, a plurality of removable members, as at 33 and 34, are mounted on the end portions 35 and 36 of the detector housing 31 and operatively sized for retaining the detector 25 in general coaxial alignment within the pipe 16. By arranging the radiation means 26 as described fully in the aforementioned simultaneously filed applications to produce discrete beams of radiation that are each of a reduced transverse width somewhat less than that of the effective portion of the detector 25 and distributing these beams at predetermined intervals across the plane of rotation, the radiation detector will produce a uniform output signal even when it is eccentrically disposed in relation to the inspection axis 17.

In the preferred embodiment of the thickness-measuring apparatus 10, the radiation-detector 25 is mounted on the free end of the lance 21 and coaxially positioned within the rotating body 27 which includes a horizontal, generally tubular member 37 having one end portion rotatably journalled within an enlarged, annular stationary housing 38 and adapted for high-speed rotation around the longitudinal inspection axis 17. The radiation means 26 are eccentrically located between two longitudinally spaced annular plates or flanges 39 and 40 secured to the unsupported or other end portion of the rotatable member 37. To dynamically balance the rotating body 27, a target 41 of sufficient mass is mounted between the spaced flanges 39 and 40 diametrically opposite of the radiation means 26.

As best seen in FIG. 2, the rotating body 27 is concentrically arranged about the horizontal inspection axis 17 and journalled within the housing 38 by a pair of longitudinally spaced bearings 42 and 43 carrying the supported end portion of the tubular member 37. In one manner of driving the rotating body 27 at high speeds about its rotational axis 17, the supported end of the tubular member 37 is extended beyond the outboard bearing 42 and coupled to driving means, such as a motor 44 mounted outside of the housing 38, by a suitable power transmission such as a typical chain or belt 45 operatively interconnecting a pulley 46 mounted on the tubular member and a pulley 47 mounted on the shaft of the motor.

As described in detail in the aforementioned three applications, the radiation means 26 are uniquely arranged to produce a substantially uniform output signal for a given thickness of metal between the radiation means and the detector 25 so as to at least minimize the effects which would otherwise be caused by even the slightest lateral shifting of the detector within the pipe 16. It should also be noted that even though the detector 25 may bounce upwardly and downwardly as the pipe 16 is being moved thereover, the radiation means 26 will also provide substantially uniform signals over an acceptable range of vertical movement of the detector inasmuch as the beams of radiation from the radiation means are well collimated and the sides of each beam is relatively parallel so that the flux density of each beam will be substantially equal at different vertical positions within the range of vertical movement of the detector. Thus, the vertical movements of the detector 25 are usually within a range where the axes of the beams of radiation from the radiation means can be perfectly parallel and still maintain a substantially equal flux density within this range.

As also described in these three copending applications, the shutter means 28 include three elongated rods, as at 48, (only one shown in FIG. 2) that are respectively arranged for sliding movement within complementary passages formed in the rotating body 27 and respectively intersecting the radiation passages 49 therein. In the preferred embodiment of the shutter means 28, the elongated rods 48 are parallel to the inspection axis 17 and are of sufficient length that they will project outwardly from the forward and rearward faces of the flanges 39 and 40. Each of these bars 48 are provided with a transverse port, as at 50, of a similar or identical cross section as the radiation passages 49 and through which radiation may readily pass when these transverse openings are in registration with the radiation passages. In accordance with the invention defined in the copending application Ser. No. 22,935, a second portion, as at 51, of each of the bars 48 has a thickness of a selected and predetermined magnitude so that upon movement of the bars to position these reduced portions in alignment with the radiation passages 49, the radiation intercepted by the radiation detector 25 will be reduced to produce a selected count rate at the detector.

The shutter means 28 as best described in the copending application Ser. No. 22,933 include means for selectively moving the shutter rods 48 to bring their respective openings 50 into registration with the radiation passages 49 just as the leading end of the pipe 16 approaches the detector 25 and then repositioning the rods to bring their respective obturating portions 51 back into the radiation passages as the trailing end of the moving pipe passes over the detector, with these movements being accomplished as the body 27 continues to rotate. In this manner, the shutter bars 48 are alternately moved between their respective positions to assure that the detector 25 will be protected from exposure to excessive radiation intensities that could otherwise cause unstability or drifting of the detector.

In the preferred embodiment of the shutter means 28, these alternately directed movements of the shutter bars 48 are accomplished by mounting rounded knobs on the outer ends of each of the rods. Since the rods 48 will follow approximately the same circular path upon rotation of the rotating body 27, a pair of straps (not shown in the drawings) of a relatively flexible material are respectively secured to the forward and rearward portions of the housing 38 and operatively arranged for pivotal movement from first positions away from the housing to second positions immediately adjacent thereto which respectively intercept the paths of rotation of the forward and rearward knobs. Selectively operated solenoid actuators 52 and 53 are arranged adjacent to the straps and so located that, upon energization of the first actuator, the shutter rods 48 will be shifted to the position illustrated in FIG. 2 before the rotating body 27 completes a full revolution. Conversely, by energizing the second actuator 53, the shutter rods 48 will be quickly shifted in the reverse direction to their alternate position for opening the radiation passages 49. In the preferred embodiment of the shutter means 28, the selective operation of the solenoid actuators 52 and 53 is accomplished by arranging typical limit switches, as at 54 and 55 in FIG. 1, for contact by the pipe 16 as it passes along the conveyor 13 to shift the shutter rods 48 back and forth in proper coordination with the operation of the thickness-measuring apparatus 10.

It will be appreciated that as the pipe 16 is advanced toward the detector 25, the flexibility of the probe 21 will allow the housing 31 to drop below the inspection axis 17. Accordingly, in keeping with the objects of the present invention, the nose of the forward housing member 35 is shaped as depicted in FIG. 2 to provide a rearwardly diverging inclined surface, as at 56, for contacting the advancing end of the pipe 16 and elevating the housing 31 to smoothly guide it into the pipe. Moreover, since the housing 31 may tend to jump upwardly when the pipe 16 first strikes the guide surface 56, the upper portion of the forward housing member 35 is relieved or faired, as at 57, to present a smaller cross-section for facilitating the entrance of the forward portion of the housing into the pipe. In this manner, it has been found that the housing 31 will not tend to strike the upper wall of the leading end of the pipe 16 as the detector housing first enters the pipe.

It should be noted that since the pipe 16 may be fully advanced over the full length of the housing 31 as, for example, when the contacts 23 are to be clamped to the probe 21, the rearward end of the rear housing member 36 is shaped similarly or identically to the forward end of the housing member 35. This will, of course, facilitate the re-entry of the housing 31 into the pipe 16 as it is returned back along the conveyors 13 and 14 to the conveyor 15.

Figure 4:
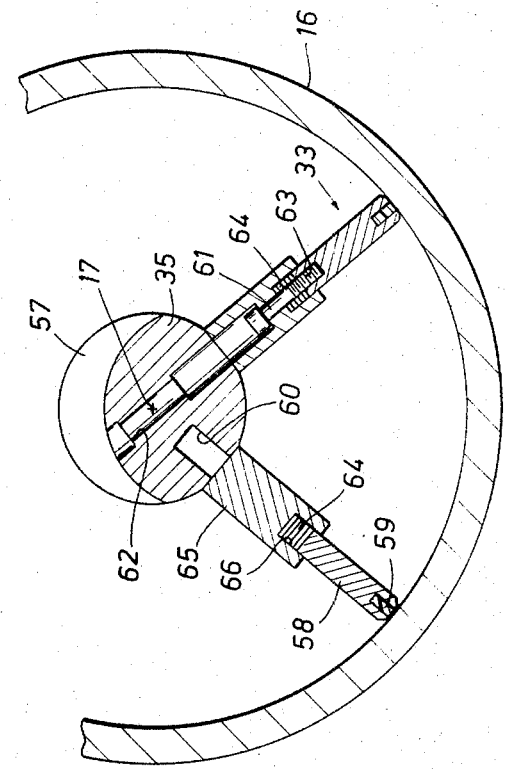
FIG. 4 is a cross-sectional view taken along the lines 4—4 in FIG. 3.

As best seen in FIGS. 3 and 4, the depending guides 33 (as well as the guides 34) are uniformly distributed on opposite sides of the lower wall of the housing 31 and appropriately sized in relation to the internal diameter of the tubular member 16 for positioning the radiation detector 25 in coincidental alignment with the inspection axis 17 when the guides are on the internal wall of the tubular member. To adapt the detector housing 31 for insertion into different sizes of tubular members, the guides 33 (as well as the guides 34) are uniquely arranged from a number of cooperative pieces which may be employed in a selected number of different combinations of one or more of such pieces for each of such guides to center the detector 25 in a corresponding number of different sizes of tubular members.

Accordingly, in keeping with the objects of the present invention, each of the guides 33 (as well as the guides 34) include a rigid bar as at 58 which is preferably formed in a generally trapezoidal shape and has an insert, as a 59, of a hardened or wear-resistant material mounted along the lower edge thereof. By shaping the bars 58 as illustrated, their inclined edges will be effective for carrying the housing 31 on into the pipe 16. The upper edge of each of these flat bars or plates 58 is adapted to be partially received within an elongated slot, as at 60, formed longitudinally along the lower surface of the forward housing member 35 (and 36 as well). To releasably secure the elongated bars 58 directly to the housing 31, a plurality of bolts, as at 61, are adapted for reception in suitably located counter-bored holes, as at 62, drilled through the forward housing member 35 (as well as the rearward member 36) and engagement with threaded bores 63 suitably located in the upper edge of the bars.

It will be appreciated, therefore, that with the elongated bars 58 fully inserted into their respective slots 60, the detector housing 31 will be adapted to be coaxially received in the smallest-diameter tubular member as determined by the dimensions of the bars and the housing. Thus, to adapt the housing 31 for coaxial reception in one or more somewhat larger tubular members, a corresponding number of tubular spacers or shims, as at 64, of progressively longer lengths are prepared to be slipped over each of the bolts 61 for retaining the elongated plates 58 at further-extended positions within the slots 60. Those skilled in the art will, of course, appreciate that the lengths of these tubular spacers 64 can be accurately regulated to adapt the detector housing 31 for insertion into many-different diameters of tubular members so long as these diameters are within the range provided by the depth of the grooves 60 and the overall height of the bars 58.

To adapt the housing 31 for insertion into still-larger tubular members, the guides 33 (and 34 as well) further include one or more sets of elongated extension bars, as at 65, having slots as at 66 along their lower edges respectively adapted to carry the bars 58 and which are releasably secured (as by bolts 67) along the lower surface of the forward housing member 35 (and rearward housing member 36 as well). Thus, as depicted in FIG. 4, by appropriately selecting the height of the extension bars 65 to cooperate with the height of the bars 58 and the various sizes of the shims 64, one set of the extension bars can be employed to position the detector housing 31 in a large number of different sizes of tubular members within the range of variation provided by the different combinations of these several members. Similarly, other sets of the extension bars 58 can be arranged to accommodate still different ranges of diameters of tubular members to be inspected by the apparatus 10.

Accordingly, it will be appreciated that the present invention has eliminated the need for employing spring-biased centralizers for centering a radiation device in a generally horizontal position within an axially moving tubular member. By providing guides comprised of a number of cooperatively sized members adapted to be assembled into different combinations of one or more of these members, the radiation device can be adapted for reception into tubular members of different sizes. Moreover, by shaping the leading portions of the housing for easy entry into an advancing tubular member, the radioactivity device can be readily introduced into an advancing tubular member without having to momentarily halt or slow the tubular member.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

WHAT IS CLAIMED IS:

1. Apparatus adapted for inspecting an elongated tubular member and comprising: conveyor means adapted for axially translating an elongated tubular member along a generally horizontal longitudinal axis; radiation-detecting means including a radiation detector mounted generally along said axis and adapted for insertion into a tubular member being advanced along said conveyor means toward said radiation detector to receive radiation directed theretoward; radiation-emitting means including a body adapted for rotation about said axis and having a passage therein directed inwardly toward said radiation detector, a radiation source operatively arranged on said rotatable body in relation to said passage for directing a beam of radiation inwardly there through toward said radiation detector, and means operatively arranged for rotating said rotatable body about said axis to progressively sweep said beam of radiation around said radiation detector; and means adapted for guiding said radiation detector into a tubular member advanced theretoward and retaining said radiation detector coaxially positioned therein including a housing having a tubular intermediate portion enclosing said radiation detector and a forward portion having a tapered nose with a lower inclined surface adapted to slide into the forward end of an advancing tubular member and a faired upper surface reducing the cross-section of said forward portion in relation to the cross-section of said intermediate portion, and a plurality of depending rigid guide members dependently secured along the bottom surface of said housing to the rear of said tapered nose, said guide members being angularly spaced uniformly in relation to one another and having a height selected for coaxially positioning said radiation detector within a tubular member when said guide members are in sliding contact with the internal wall of the tubular member.

2. The apparatus of claim 1 further including: means for detachably securing said guide members to said housing.

3. The apparatus of claim 1 wherein said guide members are elongated plates; and further including means for positioning said guide members in generally-longitudinal orientations along said bottom surface of said housing.

4. The apparatus of claim 3 wherein said means for positioning said guide members include a plurality of generally longitudinal openings disposed along said bottom surface of said housing and respectively adapted for receiving the upper portions of said guide members to position their lower surfaces at a predetermined uniform distance below said bottom surface of said housing, and means for detachably securing said guide members in their respective longitudinal openings.

5. The apparatus of claim 4 further including: a plurality of spacer members respectively adapted for reception in said longitudinal openings above said upper portions of said guide members, each of said spacer members having a selected height adapted for positioning said lower surfaces of said guide members at a predetermined greater distance below said bottom surface of said housing.

6. The apparatus of claim 3 wherein said means for positioning said guide members include a plurality of elongated spacer blocks respectively having a uniform height and a generally longitudinal opening disposed along the bottom edge thereof adapted for receiving the upper portions of said guide members to position their lower surfaces at a predetermined uniform distance below said bottom surface of said housing, first means for detachably securing said spacer blocks along said bottom surface of said housing, and second means for detachably securing said guide members to said spacer blocks.

7. The apparatus of claim 6 further including: a plurality of spacer members respectively adapted for reception in said longitudinal openings above said upper portions of said guide members, each of said spacer members having a selected height adapted for positioning said lower surfaces of said guide members at a predetermined greater distance below said bottom surface of said housing.

8. The apparatus of claim 3 further including: an elongated member disposed generally along said longitudinal axis, means coupled to the rearward end of said elongated member and adapted for supporting said elongated member, and means on the forward end of said elongated member coupled to the rearward portion of said housing and adapted for supporting said housing.

9. The apparatus of claim 8 wherein said guide members include first and second pairs of said plates, said first pair of said plates being mounted along the lower surface of said forward portion of said housing and said second pair of said plates being mounted along the lower surface of said rearward portion of said housing.

* * * * *